(12) United States Patent
Ahmad et al.

(10) Patent No.: US 8,213,926 B2
(45) Date of Patent: Jul. 3, 2012

(54) METHOD AND APPARATUS FOR PROVIDING MULTISERVICE TESTING

(75) Inventors: Attique Ahmad, Reston, VA (US); Faisal Shah, Winchester (CA)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 398 days.

(21) Appl. No.: 12/432,246

(22) Filed: Apr. 29, 2009

(65) Prior Publication Data

US 2010/0279681 A1 Nov. 4, 2010

(51) Int. Cl.
*H04W 24/00* (2009.01)
(52) U.S. Cl. .................. 455/423; 455/424; 455/425
(58) Field of Classification Search .................. 455/423, 455/424, 425
See application file for complete search history.

(56) References Cited

U.S. PATENT DOCUMENTS

| | | | |
|---|---|---|---|
| 2006/0259629 A1* | 11/2006 | Usmani et al. | 709/227 |
| 2008/0031151 A1* | 2/2008 | Williams | 370/252 |
| 2008/0195614 A1* | 8/2008 | Lutz et al. | 707/7 |
| 2009/0046590 A1* | 2/2009 | Boyes et al. | 370/250 |

* cited by examiner

*Primary Examiner* — Barry Taylor (57) ABSTRACT

An approach is provided for a multiservice tester. A connection over an access link providing a customer premise with connectivity to a plurality of telecommunication services provided over a data network is established at a test device. Testing the plurality of telecommunication services is initiated by either physically connecting to one or more end devices or invoking an emulation application for emulating the one or more end devices. The plurality of telecommunication services are verified based on performance of the connection. A secure connection may be established with a provisioning system maintained by a service provider of the plurality of telecommunication services, wherein the secure connection may be established via the access link or via one or more wireless network access links. The provisioning system may facilitate verification of the plurality of telecommunication services and/or troubleshooting the plurality of telecommunication services.

18 Claims, 8 Drawing Sheets

METHOD AND APPARATUS FOR PROVIDING MULTISERVICE TESTING

BACKGROUND INFORMATION

Modern communication networks are growing in size and complexity. For example, service providers (or carriers) are transitioning towards converged access networks capable of transporting, not only conventional data, but also voice and multimedia content. As a result, these networks are being pushed to support increased traffic flows in the midst of more sensitive delay restrictions characteristic to voice and multimedia communications. This means that traditional "best-effort" methodologies that are unable to guarantee quality of service (QoS) must give way to techniques, such as resource reservation and prioritization, that are capable of assuring sufficient availability, sequencing, and throughput, as well as diminished latency, jitter, and transportation losses. In order to provide such performance, carriers are aggressively testing infrastructures to validate their services. Unfortunately, current testing techniques that focus on particular network media (e.g., twisted pair, coax, fiber, etc.) or particular services (e.g., data, video, voice, etc.) are proving to be inefficient and, thereby, uneconomical.

Therefore, there is a need for an approach that provides multiservice testing across a broad range of network media.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing multiservice testing are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to various telecommunication services and infrastructures involving certain network components and connectors, it is contemplated that various exemplary embodiments are applicable to other technologies and equipment.

Figure 1:
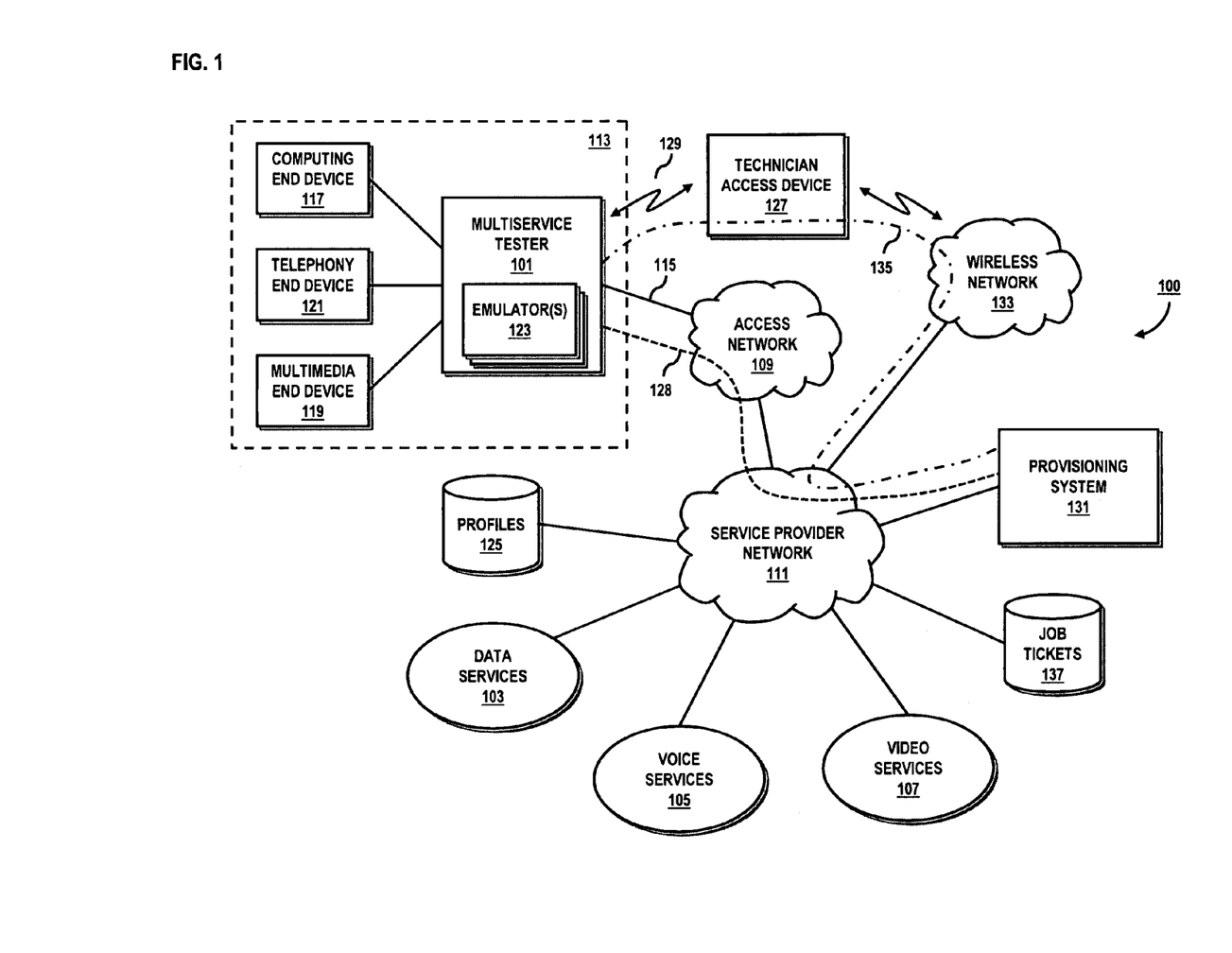
FIG. 1 is a diagram of a system configured to support multiservice testing, according to an exemplary embodiment.

FIG. 1 is a diagram of a system configured to support multiservice testing, according to an exemplary embodiment. For the purposes of illustration, system 100 is described with respect to multiservice tester 101 configured to verify, or otherwise evaluate, a plurality of telecommunication services (e.g., data services 103, voice services 105, and video services 107) provided over one or more networks, such as access network 109 and service provider network 111, to customer premise 113 via access link 115. Verification of telecommunication services 103-107 may be based on testing performance of access link 115 and comparing (or otherwise correlating) the performance in relation to one or more pre-defined thresholds. By way of example, access network 109 may be a data network configured for the transport of various forms of information (e.g., data, voice, video, etc.) between one or more sources (e.g., telecommunication services 103-107) and one or more destinations, such as computing device 117, multimedia device 119, and telephony device 121 via access link 115 that, in exemplary embodiments, can be multiplexed to support the plurality of telecommunication services 103-107. While specific reference will be made hereto, it is contemplated that system 100 may embody many forms and include multiple and/or alternative components and facilities.

It is noted that conventional testing and verification techniques that focus on particular network media (e.g., twisted pair, coax, fiber, etc.) or particular services (e.g., data, video, voice, etc.) are inefficient. For example, service providers have traditionally utilized mutually exclusive testers for effectuating testing and verification, which results in unnecessary expenditures of capital. In other instances, technicians may unable to troubleshoot an issue with the resources currently available to them. Still further, a service provider may not be aware of the status of a job (or task or "ticket") until a technician reports such information. Therefore, the approach according to certain embodiments stems from the recognition that providing testers, such as handheld testers, configured to support multiple networking technologies enables technicians to efficiently verify the efficacy of service deployment, as well as determine and troubleshoot connectivity issues and report job status information, provide more effective and efficient techniques for telecommunication service testing and verification.

As networks converge and, thereby, increase the number of services (or applications) multiplexed onto an access link (e.g., access link 115) of an access network (e.g., access network 109), various issues arise in the testing and verification of these services. For instance, services 103-107 may transmit and/or receive disparate types of traffic flows over networks 109 and 111, each of which may be characterized by one or more levels of performance, such as differing levels of jitter (i.e., the variation in time between transmission units forming a flow of traffic over a "same" route), latency (i.e., the time it takes a transmission unit to travel between transmitting and receiving entities), latency distribution (i.e., a measure of total number of transmission units received over a predetermined time interval), latency over time (i.e., a determination of a number of transmission units received plus a minimum latency over a predetermined time interval), sequence (i.e., a measure of transmission unit losses), and throughput (i.e., a rate at which transmission units are transmitted over a network), as well as any other suitable performance parameter. Telecommunication services 103-107 may specify particular classes of service, protocol types, priorities, source/destination addresses, ports, privatization techniques, end devices, bandwidths, etc. As such, multiservice tester 101 may include one or more applications and interfaces (whether physical or emulated) for testing and verifying telecommunication services 103-107 over access link 115. Multiservice tester 101 is described in more detail in conjunction with FIGS. 2-3B.

In exemplary embodiments, access link 115 may be multiplexed for the delivery of a plurality of telecommunication services (e.g., data services 103, voice services 105, video services 107, etc.) over one or more networks, such as networks 109 and 111. It is generally noted that these telecommunication services 103-107 may be defined by one or more flows of network traffic (e.g., transmission units, such as one or more blocks, cells, frames, packets, etc.) embodying content, such as data streams in the case of data services 103, telephony communications in the case of voice services 105, and video broadcasts in the case of video services 107. Each type of flow may be transported to customer premise 113 via access link 115 and, thereby, tested and verified via multiservice tester 101. Even though only one access link and one customer premise 113 are shown, it is contemplated that system 100 may include any number of access networks, each of which may be configured to support one or more customer premises via one or more access links.

Accordingly, multiservice tester 101 may be configured, in exemplary embodiments, to establish a connection over access link 115 providing customer premise 113 with connectivity to telecommunication services 103-107. Multiservice tester 101 may initiate testing of one or more of telecommunication services 103-107 by either physically connecting to one or more end devices (e.g., end devices 117-121) or by invoking one or more emulators (or emulation applications) 123 for emulating, or otherwise mimicking, end devices 117-121. That is, emulators 123 may serve as a virtual end device capable of functioning as one or more of end devices 117-121 and, thereby, provide technicians with the ability and corresponding interfaces to simulate, for example, a phone, television, workstation, or any other suitable end device. As such, emulators 123 allow technicians to test and verify telecommunication services 103-107 at customer premise locations that are not yet equipped with all or various ones of end devices 117-121. Various other exemplary end devices are provided below.

In particular embodiments, multiservice tester 101 may be configured to detect the existence of a physical connection to a particular end device (e.g., computing end device 117), wherein a particular mode of testing may be implemented based on detection. For example, multiservice tester 101 may switch between an emulation and non-emulation testing mode depending on whether a physical connection to an end devices is established at multiservice tester 101. Once multiservice tester 101 initiates testing of telecommunication services 103-107 over access link 115, performance information may be gathered and/or generated. This performance information may be analyzed, such as correlated with one or more predetermined threshold values, such as telecommunication service requirements, negotiated service level agreement parameters, etc., for validating telecommunication services 103-107. Predetermined threshold values may be stored at profiles repository 125 or any other suitable storage location of or accessible to system 100, such as a memory of multiservice tester 101 (now shown). In this manner, testing and verification of telecommunication services may be performed locally, i.e., at customer premise 113, via multiservice tester 101.

According to certain embodiments, testing of telecommunication services 103-107 may be performed by multiservice tester 101 and subsequent analysis and verification may be executed by an access device 127 associated with a technician. In this manner, performance information may be transmitted to technician access device 127 via a wireless connection 129, such as a bluetooth, infrared, wireless fidelity, radio frequency, etc., tethered connection. It is also contemplated wired connections, e.g., universal serial bus, firewire, etc., connections may be utilized. Multiservice tester 101 may alternatively (or additionally) transmit the performance information to a provisioning system 131 that, in exemplary embodiments, may be maintained by a provider of telecommunication services 103-107. Provisioning system 131 may be configured to analyze and verify telecommunication services 103-107. In particular embodiments, multiservice tester 101 may utilize access link 115 to transmit the performance information to provisioning system 131 via, for example, path 128. Alternatively (or additionally), multiservice tester 101 may transmit the performance information to technician access device 127 that may, in turn, relay the performance information to provisioning system 131 via wireless network 133, i.e., via path 135. Paths 128 and 129, as well as wireless connection 129, may be secure paths or connections, e.g., virtual private networking paths or connections. Although it is not illustrated, multiservice tester 101 may be configured to communicate with technician access device 127 and/or provisioning system 131 via wireless network 133.

In particular embodiments, multiservice tester 101, technician access device 127, and/or provisioning system 131 may be configured to generate troubleshooting information based on the performance information. In this way, technicians may access a knowledge base for remedying various connectivity issues.

Provisioning system 131 may also be configured to exchange workforce information with multiservice tester 101 for managing the verification of telecommunication services 103-107. That is, provisioning system 131 and multiservice tester 101 may interface with one another, as well as interface with job tickets repository 137 for updating status information and/or any other suitable workforce parameter relating to a work order or work schedule. It is noted that this status information may be stored to a memory (not shown) of provisioning system 131 and technician access device 127, as well as transmitted between provisioning system 131, technician access device 127, and/or multiservice tester 101. As such, provisioning system 131 includes a communication interface (not illustrated) that is configured to transmit and receive status information, either "on-demand" or as the result of a predefined schedule, such as continuously or periodically. This enables a service provider to efficiently monitor and optimize the deployment of their workforce for provisioning and verifying new and/or existing multiservice installations.

It is generally noted that the workforce information may correspond to parameters, such as one or more members of the workforce, and relate to availability (e.g., scheduling information), skills, training, billing rate, current assignment, and employee/contractor status, as well as workforce contingent parameters, such as work preferences, etc. Additionally, the workforce information may relate to deployed multiservice testers, transportation vehicles, technician access devices, or any other workforce related resource.

According to exemplary embodiments, networks 109, 111, 133 may be any suitable wireline and/or wireless network capable of supporting one or more telecommunication services 103-107 or the transport of information between multiservice tester 101 and technician access device 127 or provisioning system 131. For example, networks 109, 111, 133 may include one or more circuit-switched networks (e.g., the public switched telephone network (PSTN), an integrated services digital network (ISDN), a private branch exchange (PBX), etc.), data networks (e.g., local area network (LAN), metropolitan area network (MAN), wide area network (WAN), the Internet, or other suitable packet-switched network, such as a commercially owned, proprietary packet-switched network having voice over internet protocol (VoIP) capabilities, e.g., a proprietary cable or fiber-optic network), and/or wireless networks (e.g., code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. It is particularly noted that access network 109 may be data network, such as a packet-switched network.

Although depicted as separate entities, networks 109, 111, and 131 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that networks 109, 111, and 133 may include components and facilities to provide for signaling and/or bearer communications between the various components or facilities of system 100. In this manner, networks 109, 111, and 133 may embody or include portions of a signaling system 7 (SS7) network, or other suitable infrastructure to support control and signaling functions.

It is noted that end devices 117-121 may include any suitable customer premise equipment (CPE) capable of supporting one or more telecommunication services, such as telecommunication services 103-107, that may be provided over one or more networks (e.g., networks 109 and 111) via access link 115. For instance, telephony end device 121 may be any suitable plain old telephone service (POTS) device, facsimile machine, etc. Multimedia end device 119 may be any suitable monitor, television, media player, gaming system, set-top box, sound system, etc., capable of presenting various types of media or mixed media, such as text, audio, still images, animation, video, interactive applications, etc. Further, computing end device 117 may be any suitable computing device, such as an access point, voice over internet protocol (VoIP) phone, notebook computer, skinny client control protocol (SCCP) phone, session initiation protocol (SIP) phone, IP phone, personal computer, softphone, workstation, terminal, server, modem, router, etc. It is also noted that end devices 117-121 may provide overlapping functionality. For example, computing device 117 may be capable of telephony features and multimedia presentations and, thereby, may also be considered a telephony end device 121 and a multimedia end device 119.

Technician access device 127 may be, according to exemplary embodiments, any suitable computing end device capable of transmitting and receiving information over one or more of networks 109, 111, and 131. That is, technician access device 131 may be any one of computing end devices 117 and/or may be a cellular phone, radio phone, satellite phone, smart phone, wireless phone, or any other suitable mobile device, such as a personal digital assistant, pocket personal computer, tablet, notebook, customized hardware, etc. In this manner, technician access device 127 may include various components for effectuating short-range and/or long range wireless technologies for wirelessly communicating with multiservice tester 101 and wireless network 133. While not illustrated, technician access device may also be configured for communication via access network 109 and, thereby, include one or more components for such communications.

Figure 2:
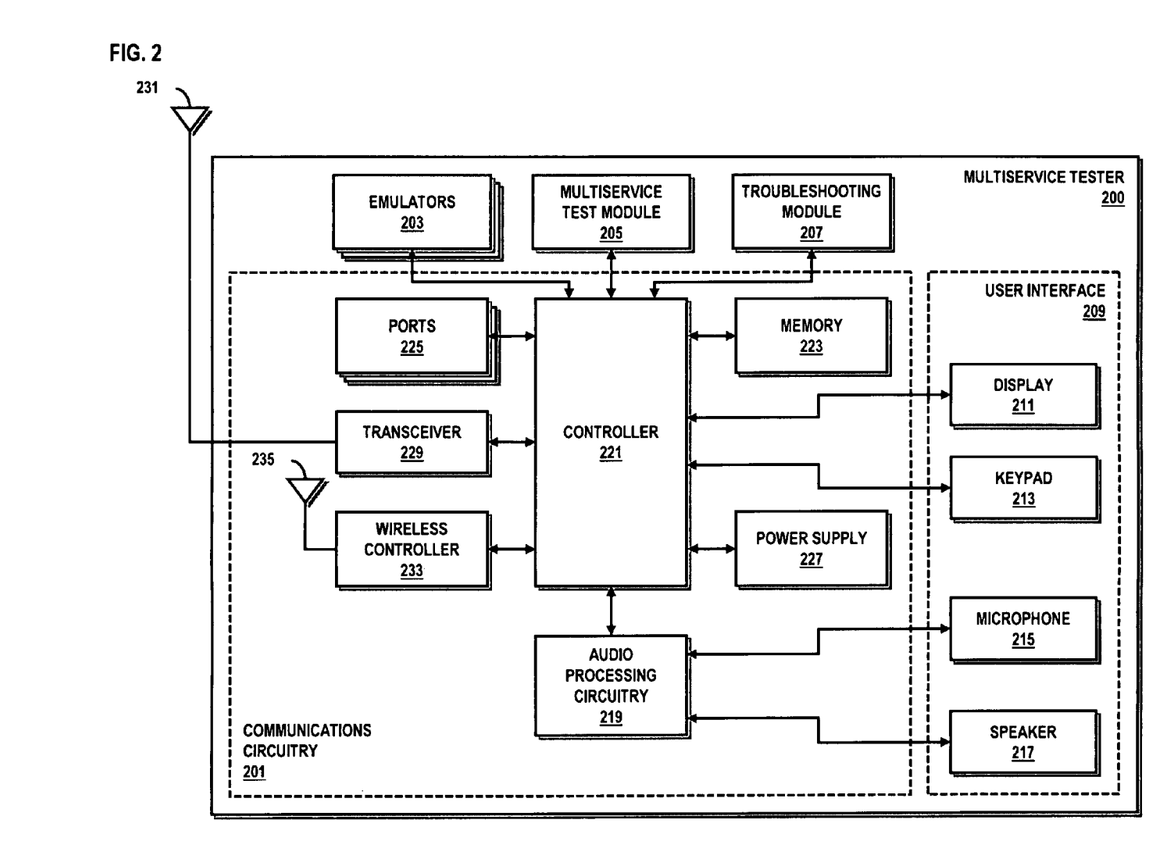
FIG. 2 is a functional block diagram of a multiservice tester, according to an exemplary embodiment.

FIG. 2 is a functional block diagram of a multiservice tester, according to an exemplary embodiment. By way of example, multiservice tester (or tester) 200 may comprise computing hardware (such as described with respect to FIG. 7) configured to execute the processes described herein. In one implementation, tester 200 includes communications circuitry 201, one or more emulators 203, multiservice test module 205, troubleshooting module 207, and user interface 209. It is also contemplated, however, that tester 200 may include many forms and multiple and/or alternative components and configurations.

According to exemplary embodiments, multiservice test module 205 may be configured to monitor and generate performance information corresponding to traffic flows between telecommunication services 103-107 and end-devices 117-121. It is noted that when tester 200 emulates one or more end devices, multiservice test module 205 monitors traffic flows on ports 225. In this manner, multiservice test module 205 may be configured to detect the existence of a physical connection with an end device (e.g., multimedia end device 119) by monitoring ports 225 for such connections or by one or more inputs to user interface 209. As such, multiservice test module 205 may toggle between emulation and non-emulation testing based on the detection of one or more physical connections to end devices 117-121. As previously mentioned, emulators 203 emulate the attributes of end devices 117-121. Emulators 203 may include telephony device emulators, computing device emulators, and multimedia device emulators. A particular emulator 203 may be invoked based on detecting the particular port type that tester 200 utilizes to establish a connection with access network 109 or may be invoked based on one or more inputs to user interface 209. Emulators 203 may also include decoders for decoding traffic flows received from telecommunication services 103-107.

Troubleshooting module 207 may receive performance information from multiservice test module 205 for identifying potential sources of connectivity issues. In certain instances, troubleshooting module 207 may initiate signaling over access link 115 or over one or more links to end devices 117-121 to help isolate and diagnose faults.

User interface 209 includes display 211, keypad 213, microphone 215, and speaker 217. Display 211 provides a graphical user interface (GUI) that permits a user (e.g., a service provider technician) of tester 200 to verify the efficacy of service deployment and/or determine service quality parameters associated with a plurality of telecommunication services (e.g., telecommunication services 103-107) provided over one or more networks, such as access network 109 and service provider network 111. The GUI may include icons and menus, as well as other text and symbols for verifying telecommunication services 103-107, troubleshooting issues associated with telecommunication services 103-107 or networks 109 and 111. In certain instances, the GUI may be utilized to exchange information with various components of system 100, such as end devices 117-121, technician access device 127, provisioning system 131, etc., as well as one or more repositories, e.g., profiles repository 125, job ticket repository 137, and the like. For instance, the GUI may enable users to establish secure connections (e.g., paths 128 and 135), exchange status and workforce information, and/or perform the processes described herein.

Keypad 213 includes an alphanumeric keypad and may represent other input controls, such as a joystick, button controls, dials, etc. According to certain exemplary embodiments, keypad 213 may be provided by display 211, such as in the form of a touch screen keypad 213 of display 211. In this manner, display 211 may include one or more resistive, surface acoustic, capacitive, projected capacitance, optical, strain gauge, optical imaging, dispersive signal, acoustic pulse recognition, etc., panels or regions. While not illustrated, tester 200 may also include one or more actuators for providing users with tactical feedback when interacting with display 211. Additionally (or alternatively), tester 200 may provide users with an audio interface via microphone 215 and speaker 217. That is, microphone 215 may be configured to convert spoken utterances into electronic audio signals and speaker 217 may be configured to convert audio signals into corresponding sounds. As such, a user can acquire profile information (e.g., predetermined threshold values), enter commands, initialize applications, input remote addresses, initiate and perform multiservice testing, exchange status and workforce information, troubleshoot connectivity issues, and select options from one or more menu (or option) systems.

Communications circuitry 201 includes audio processing circuitry 219, controller 221, memory 223, ports 225, power supply 227, transceiver 229 coupled to antenna 231, and wireless controller 233 coupled to antenna 235. Transceiver 229 is configured for exchanging long-range communications over wireless network 133, whereas wireless controller 233 is configured for exchanging short-range communications with, for example, technician access device 127 via wireless connection 129. Ports 225 provide physical interfaces for establishing connections with access network 109, end devices 117-121, and/or technician access device 127. In this manner, ports 225 may include male or female connection sites for various network media, such as twisted pair, coax, fiber optic, etc., media. For example, tester 200 may provide one or more register jack (RJ) ports (e.g., RJ11, RJ45, etc.), one or more coaxial connectors (such as bayonet neill-concelman (BNC) connectors, subminiature connectors (e.g., SMA, SMB, etc.), for mobile equipment (FME) connectors, threaded neill-concelman (TNC) connectors, etc.), one or more and fiber optic connectors (e.g., ferrule connector (FC), Toshiba link (TOSLINK) connector, media interface connector (MIC), straight tip (ST) connector, etc.), as well as any other suitable connector or connection site, such as a socket for receiving an input plug to a power supply for charging power supply 227.

Memory 223 may represent a hierarchy of memory, which may include both random access memory (RAM) and read-only memory (ROM). Computer program instructions, such as testing, verification, and user interface application instructions, and corresponding data for operation can be stored to non-volatile memory, such as erasable programmable read-only memory (EPROM), electrically erasable programmable read-only memory (EEPROM), and/or flash memory. Memory 233 may be implemented as one or more discrete devices, stacked devices, and/or integrated with controller 221. Memory 223 may store information, such as one or more profiles, policies, threshold parameters, troubleshooting information, etc., as well as any other information for carrying out the processes described herein.

Controller 221 controls the functioning (or operation) of tester 200 according to programs and/or data stored to memory 223. It is noted that control functions may be implemented by a single controller or multiple controllers. As such, suitable controllers may include one or more microcontrollers, microprocessors, application specific integrated circuits (ASIC), and/or the like. These devices may be general purpose controllers, special purpose controllers, digital signal processors, or any other suitable control means. Alternatively (or additionally), controller 221 may include one or more processors that execute one or more instructions stored within, for example, memory 223 (or any other suitable storage location), to carry out the processes described herein. Controller 221 may interface with audio processing circuitry 219, which provides basic analog output signals to speaker 217 and receives audio inputs from microphone 215.

Figure 3A:
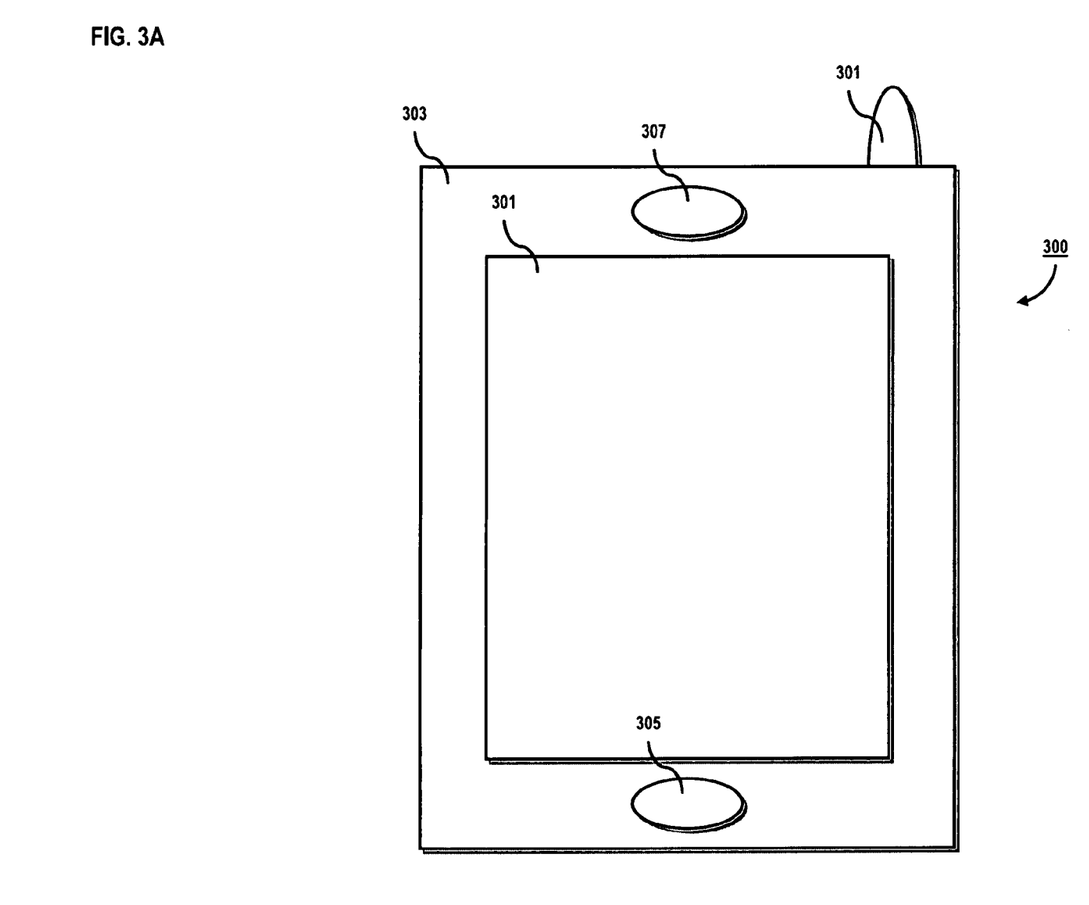
FIGS. 3A-3C are diagrams of a handheld multiservice tester, according to exemplary embodiments.
Figure 3B:
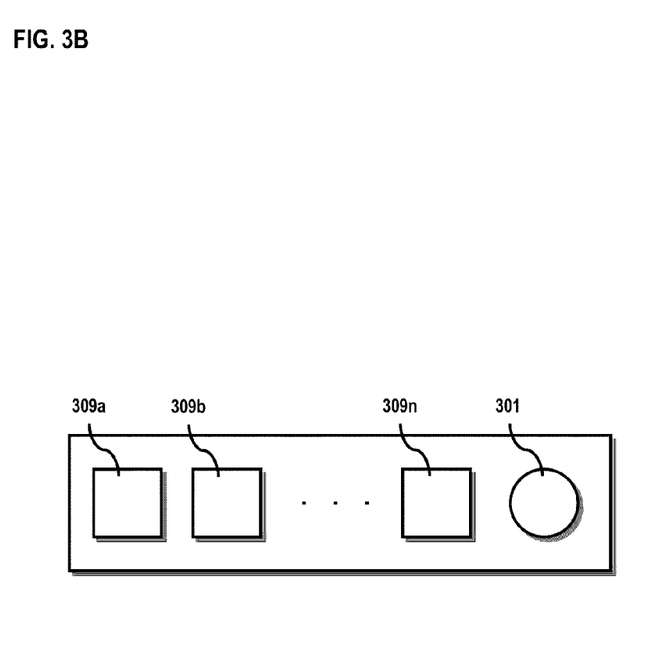
Figure 3C:
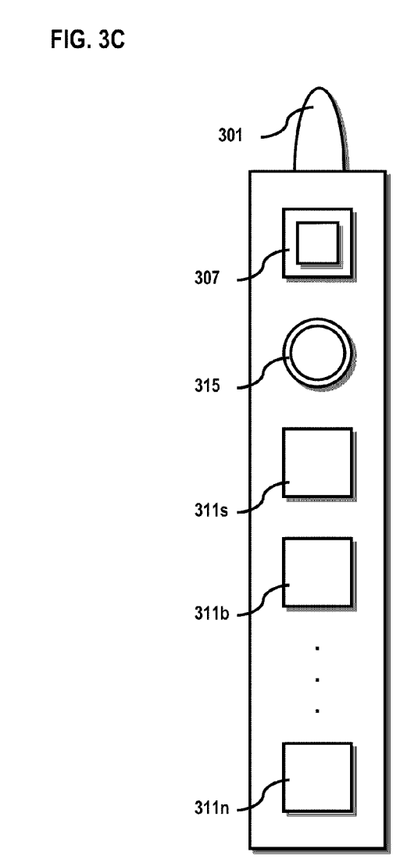

According to exemplary embodiments, multiservice tester 200 may be provided as a handheld device. FIGS. 3A-3C are diagrams of a handheld version of a multiservice tester (or tester) 300 from, respectively, a front, a top, and a side view. As shown, tester 300 includes antenna 301, housing 303, microphone 305, on/off switch 307, ports 309a, 309b, . . . , 309n, ports 311a, 311b, . . . , 311n, power supply adapter socket 313, and speaker 315. Although tester 300 is illustrated in a particular manner, it is contemplated that one or more of the aforementioned components may be alternatively (or additionally) provided, such as on one or more other surfaces of tester 300, internalized within housing 303, such as in the case of antenna 301, or otherwise provided. It is also contemplated that handheld tester may include one or more of the non-illustrated components that were described with respect to FIG. 2, e.g., keyboard 211.

Figure 4:
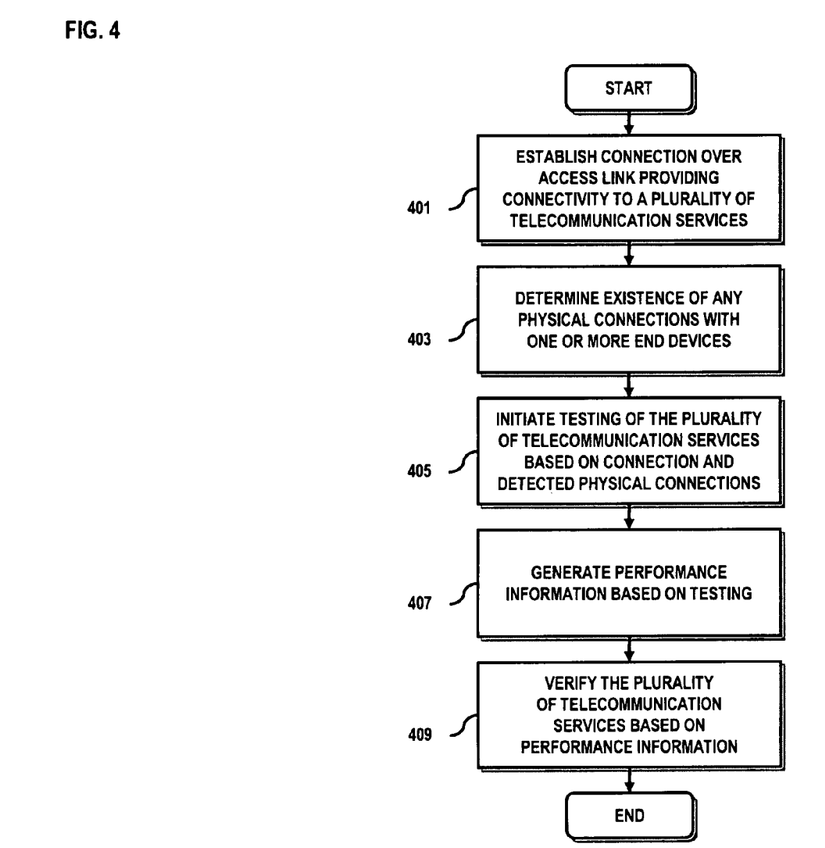
FIG. 4 is a flowchart of a process for multiservice testing, according to an exemplary embodiment.

FIG. 4 is a flowchart of a process for multiservice testing, according to an exemplary embodiment. For illustrative purposes, the process is described with respect to FIGS. 1 and 2. At step 401, tester 200 establishes a connection over access link 115 providing customer premise 113 with connectivity to telecommunication services 103-107. In step 403, tester 200 determines whether any physical connections have been established with one or more end devices, such as end devices 117-121. Testing of telecommunication services 405 is initiated, per step 405, based on the established connection and whether or not any physical connections were detected. For example, the connection may have been established between voice services 105 and video services 107, but only a physical connection to telephony end device 121 may have been detected. In this manner, multiservice test module 205 may invoke an emulator 203 for emulating a multimedia device for testing and verifying video service 107 and may invoke non-emulation testing for verifying voice service 105. Namely, given that, in this example, a physical connection to telephony end device 121 is assumed to exist at tester 200, multiservice test module 205 may simply monitor and analyze traffic flows between voice service 105 and telephony end device 121 for verifying voice service 107. Further, since a multimedia end device 119 (e.g., a television) is assumed, in this example, to not be physically connected with tester 200, then multiservice test module 205 may employ an emulator 203 (e.g., a multimedia end device emulator) to enable tester 200 to imitate, via software and/or hardware, the attributions and/or functions of a multimedia end device 119, such that multiservice test module 205 may monitor and analyze traffic flows on, for example, ports 225 to verifying video services 107. At step 407, multiservice test module 205 generates performance information, such as information relating to jitter, latency, latency distribution, latency over time, throughput, service quality, etc., based on the testing, e.g., monitoring and analyzing traffic flows between end devices 117-121 and telecommunication services 103-105. Per step 409, multiservice test module 205 verifies telecommunication services 103-105 based on the performance information. For example, generated performance information may be compared in relation to one or more predefined thresholds stored to memory 223 of tester 200 or retrieved from profiles repository 125. It is also contemplated that tester 200 may transmit the performance information, such as via path 128 or 135, to technician access device 128 and/or provisioning system 131 for service verification.

Based on the relationship between the performance information and one or more predefined thresholds, troubleshooting information may be generated for identifying, pinpointing, and/or diagnosing connectivity issues. This troubleshooting information may be generated by troubleshooting module 207, technician access device 127, and/or provisioning system 131.

Figure 5:
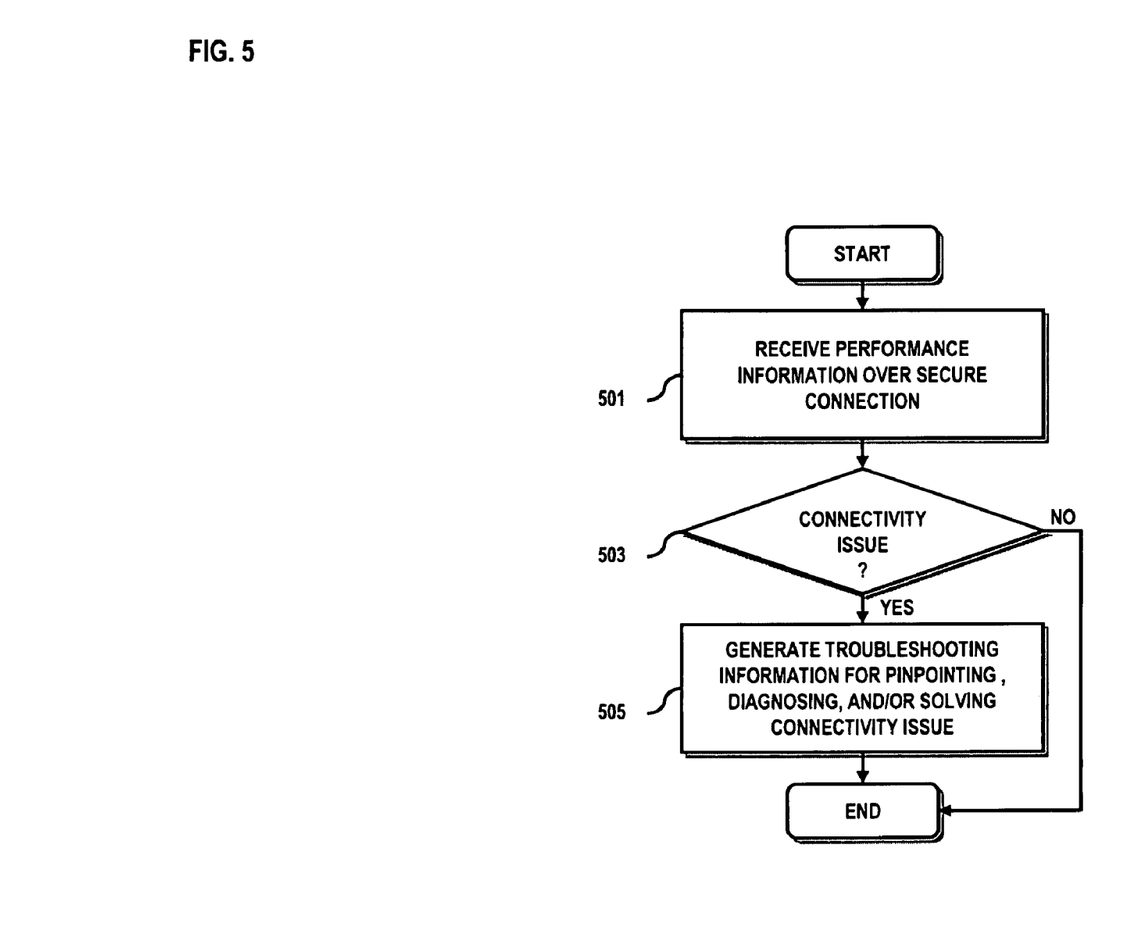
FIG. 5 is a flowchart of a process for generating troubleshooting information to provide to a multiservice tester, according to an exemplary embodiment.

FIG. 5 is a flowchart of a process for generating troubleshooting information to provide to a multiservice tester, according to an exemplary embodiment. For illustrative purposes, the process is described with respect to FIGS. 1 and 2, and as being executed by provisioning system 131; however, the process may be performed by troubleshooting module 207 and/or technician access device 127. At step 501, provisioning system 131 receives performance information over a secure connection, e.g., path 135. In step 503, provisioning system 131 determines whether a connectivity issue exists. If no connectivity issue exists, the process ends; otherwise, per step 505, troubleshooting information is generating for pinpointing, diagnosing, and/or solving the identified connectivity issue. This troubleshooting information may be presented to a technician via user interface 209. For example, the performance information may indicate that a traffic flow (e.g., a video broadcast) is being successfully received at customer premise 113, but an end-device (e.g., multimedia end device 119) is unable to display the content from video services 107. As such, the troubleshooting information may ask the technician to execute service verification via an emulation mode or may inform the technician that multimedia end device 119 is not operating and may provide the technician with a list of steps for solving the problem, such as checking whether the end device is powered on, plugged in, capable of displaying other content, etc.

Figure 6:
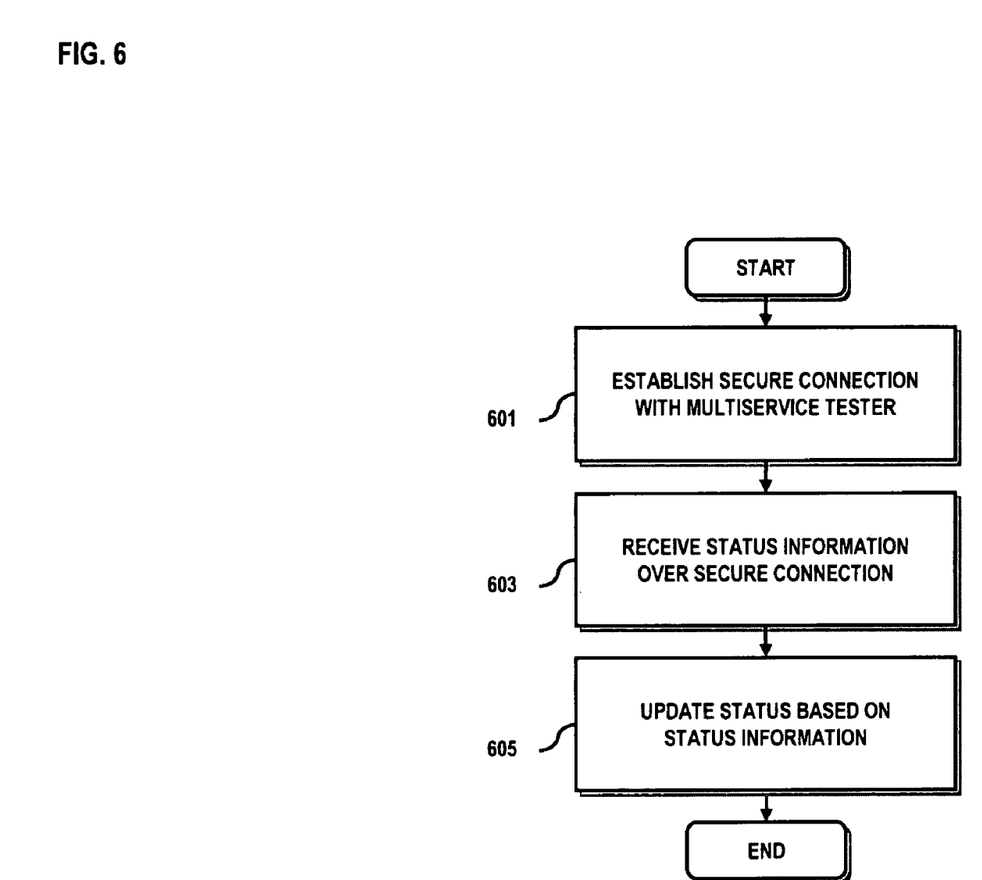
FIG. 6 is a flowchart of a process for updating a job status associated with multiservice testing, according to an exemplary embodiment.

According to exemplary embodiments, a stage of service verification may be updated by provisioning system 131 based on information received from multiservice tester 101. FIG. 6 is a flowchart of a process for updating a job status associated with multiservice testing, according to an exemplary embodiment. For illustrative purposes, the process is described with respect to FIGS. 1 and 2. At step 601, provisioning system 131 establishes a secure connection with multiservice tester 200 via, for example, path 128 or path 135. In step 603, provisioning system 131 receives status information over the secure connection, such as an indication that one particular service (e.g., voice service 105) has been successfully verified, another particular service (e.g., data service 103) is being performed, and that another particular service (e.g., video service 107) was unsuccessfully verified and requires additional resources for solving the connectivity issue. In this manner, provisioning system 131 may update status information stored to job tickets repository 137 (or any other suitable storage location of system 100) based on the received status information. As such, a service provider may implement proactive measures based on the updated status. For instance, provisioning system 131 may dispatch another technician to customer premise 113 with additional resources and/or skills capable of solving the connectivity issue as expeditiously as possible.

The processes described herein for providing a multiservice tester may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
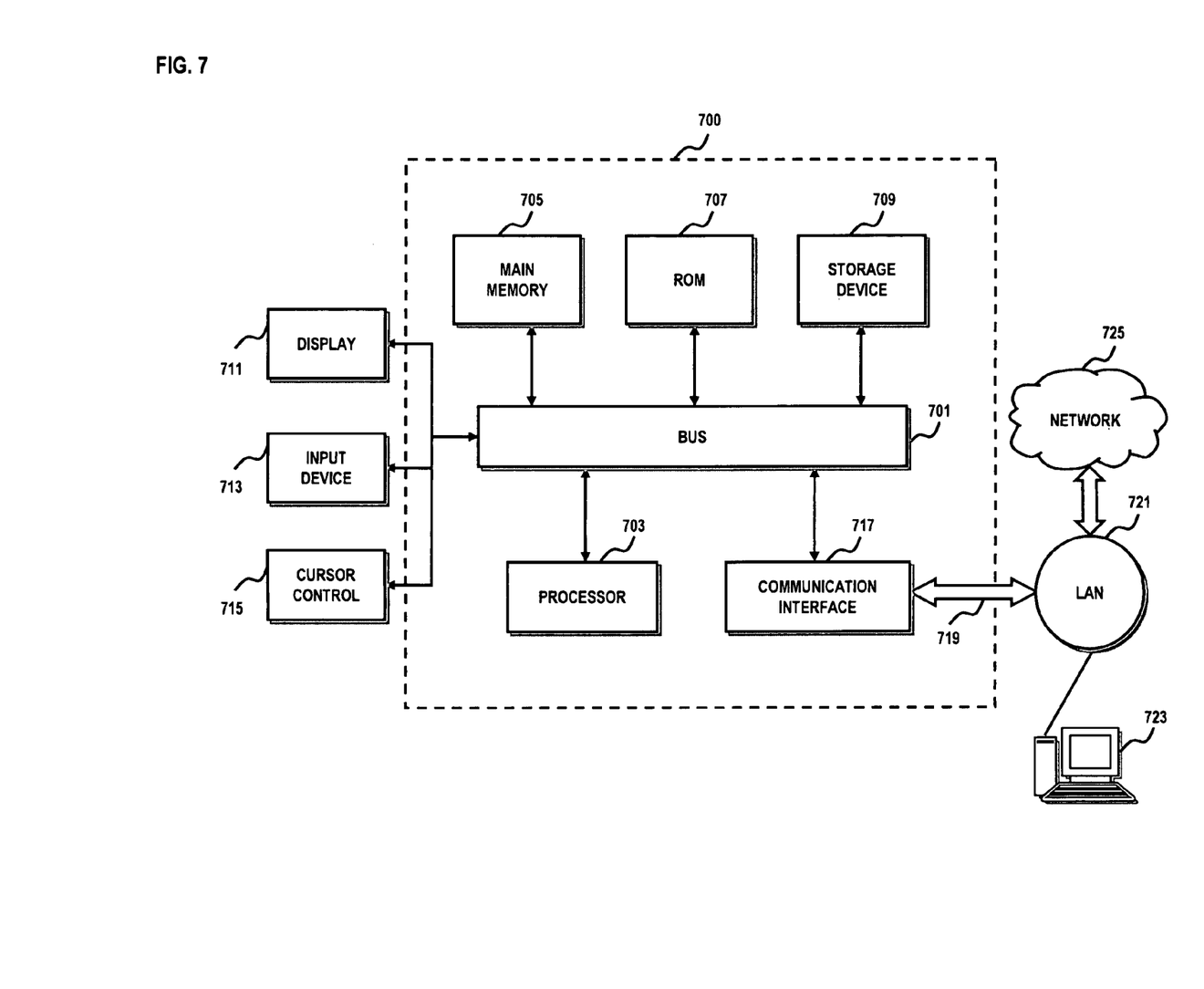
FIG. 7 is a diagram of a computer system that can be used to implement various exemplary embodiments.

FIG. 7 illustrates computing hardware (e.g., computer system) 700 upon which an embodiment according to the invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711. In certain embodiments, display 711 may be adapted to include input device 713 in order to provide, for example, a touch screen user interface.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    establishing, at a multiservice test device, a first connection to an access link providing a customer premise with connectivity to one or more telecommunication services provided over a data network;
    determining at least one of the one or more telecommunication services for testing based on a detection of the first connection at one of a plurality of media ports;
    verifying the at least one telecommunication service based on a performance of the first connection; and
    determining a mode of testing for the at least one telecommunication service based on a detection of a second connection, at the multiservice test device, to an end device.

2. A method according to claim 1,
    wherein the determined mode of testing is non-emulation when the second connection to the end device is detected.

3. A method according to claim 1, wherein the one or more telecommunication services include at least one of data, voice, and video services.

4. A method according to claim 1, further comprising:
    comparing the performance in relation to one or more predefined thresholds; and
    executing a troubleshooting application based on the comparison of the performance.

5. A method according to claim 1, further comprising:
    establishing a secure connection with a provisioning system maintained by a service provider of the one or more telecommunication services,
    wherein the secure connection is established via the access link or via one or more wireless network access links.

6. A method according to claim 5, wherein the secure connection further includes a secure tethered link between the multiservice test device and a technician access device in communication with the provisioning system.

7. A method according to claim 1, wherein the performance relates to one or more throughput, latency, delay, jitter, service quality, or sequence tracking parameters.

8. A method according to claim 1, wherein the end device is a telephony device, a multimedia device, or a computing device.

9. An apparatus comprising:
    a communication interface including a plurality of media ports configured to establish a first connection to an access link providing a customer premise with connectivity to one or more telecommunication services provided over a data network, and to establish a second connection to an end device; and
    a processor configured to determine at least one of the one or more telecommunication services for testing based on a detection of the first connection at one of the plurality of media ports, verify the at least one telecommunication service based on a performance of the first connection, and determine a mode of testing for the one or more telecommunication services based on a detection of the second connection to the end device.

10. An apparatus according to claim 9, wherein the plurality of media ports include
a registered jack port and a coax port.

11. An apparatus according to claim 9, further comprising:
a display configured to provide a touchscreen interface.

12. An apparatus according to claim 9, wherein in the processor is further configured to:
compare the performance in relation to one or more predefined thresholds; and
execute a troubleshooting application based on the comparison of the performance.

13. An apparatus according to claim 9, wherein the communication interface is further configured to interface with a technician access device via wireless fidelity, bluetooth, or infrared.

14. An apparatus according to claim 9, wherein the communication interface is further configured to establish a secure connection with a provisioning system maintained by a service provider of the one or more telecommunication services.

15. An apparatus according to claim 14, wherein the secure connection includes a secure tethered connection with a technician access device.

16. A method comprising:
receiving performance information related to testing one or more telecommunication services provided over a data network via an access link that enables a customer premise to access the one or more telecommunication services; and
verifying the one or more telecommunication services based on comparing the performance information in relation to one or more predefined thresholds,
wherein the testing includes determining at least one of the one or more telecommunication services for the testing based on a detection of a first connection to one of a plurality of media ports at a multiservice test device establishing a connection between the multiservice test device and the access link, and determining a mode of testing for the one or more telecommunication services based on a detection of a second connection, at the multiservice test device, to an end device.

17. A method according to claim 16, further comprising:
generating troubleshooting information based on the performance information; and
transmitting the troubleshooting information to the multiservice test device over a secure connection.

18. A method according to claim 16, further comprising:
receiving job status information from the multiservice test device; and
updating a job status for verifying the one or more telecommunication services at the customer premise.

* * * * *